United States Patent [19]

Peach et al.

[11] Patent Number: 5,321,604
[45] Date of Patent: Jun. 14, 1994

[54] APPARATUS AND PROCESS FOR ADMINISTERING PROMOTIONAL MAILING

[75] Inventors: John A. Peach, Monticello; Paul H. Korba, Lakeland; Kenneth M. Rapp, St. Paul, all of Minn.

[73] Assignee: Fulfillment Systems Inc., Monticello, Minn.

[21] Appl. No.: 830,635

[22] Filed: Feb. 4, 1992

Related U.S. Application Data

[62] Division of Ser. No. 649,970, Feb. 4, 1991, Pat. No. 5,085,470, which is a division of Ser. No. 328,109, Mar. 23, 1989, Pat. No. 5,053,955.

[51] Int. Cl.$^5$ .................. G06F 15/22; G06F 15/24; G06G 7/52
[52] U.S. Cl. .................. 364/401; 209/3.1; 209/509; 209/900
[58] Field of Search .................. 364/401; 209/3.1, 509, 209/900

[56] References Cited

U.S. PATENT DOCUMENTS

| | | | |
|---|---|---|---|
| 263,347 | 8/1892 | Mead | 229/92.8 |
| 443,141 | 12/1890 | Kittredge | 283/56 |
| 914,460 | 3/1909 | Selden | 283/58 |
| 1,264,795 | 4/1918 | Hill | 229/92.8 |
| 1,374,501 | 4/1921 | Greig | 283/56 |
| 1,415,596 | 5/1922 | McKinnie | 283/56 |
| 1,613,881 | 1/1927 | Garvin | 283/60.1 |
| 1,946,751 | 2/1934 | McCarthy | 229/92.3 |
| 1,957,374 | 2/1934 | Unger | 283/116 |
| 2,277,596 | 3/1942 | Lichter | 283/56 |
| 2,723,078 | 11/1965 | Tilly | 229/92.8 |
| 2,831,707 | 4/1958 | James, Jr. et al. | 283/58 |
| 2,835,512 | 5/1958 | Whitman | 283/58 |
| 3,075,791 | 1/1963 | Wolf | 283/58 |
| 3,211,470 | 10/1965 | Wilson | 283/85 |
| 3,790,070 | 2/1974 | Schnitzer et al. | 229/92.8 |
| 4,128,202 | 12/1978 | Buros | 283/58 |
| 4,167,476 | 9/1979 | Jackson | 209/3.3 |
| 4,321,672 | 5/1982 | Braun et al. | 364/408 |
| 4,385,285 | 5/1983 | Horst et al. | 235/379 |
| 4,496,961 | 1/1985 | DeVrient | 283/58 |
| 4,554,446 | 11/1985 | Murphy et al. | 235/487 |
| 4,585,160 | 4/1986 | Fiske, II | 283/58 |
| 4,634,147 | 1/1987 | McClure | 283/58 |
| 4,667,985 | 5/1987 | Leonard et al. | 283/58 |
| 4,722,554 | 2/1988 | Pettit | 285/105 |
| 4,723,212 | 2/1988 | Mindrum et al. | 364/401 |
| 4,853,852 | 8/1989 | Rosen | 364/401 |
| 4,862,386 | 8/1989 | Axelrod et al. | 364/464.02 |
| 4,908,761 | 3/1990 | Tai | 364/401 |
| 4,997,337 | 3/1991 | Trimble | 414/790.4 |
| 5,053,955 | 10/1991 | Peach et al. | 364/401 |
| 5,085,470 | 2/1992 | Peach et al. | 283/58 |

OTHER PUBLICATIONS data pro ® directory of Software, Datapro Research, Delran, NJ, published by McGraw-Hill, Inc., Jul. 1990, pp. D65-200-001 thru 009.

*Primary Examiner*—Roy N. Envall, Jr.
*Assistant Examiner*—Laura Brutman
*Attorney, Agent, or Firm*—Frederick W. Niebuhr

[57] ABSTRACT

A process is disclosed for merging promotional information, based on multiple requests and relating to different promotions, into a single stream for the printing and mailing of coupons, checks or other promotional items. The requests relating to a particular promotion are matched with an associated promotion control record, with one or more promotions similarly associated with an account control record in the, case of preparing checks. Prior to printing, individual data entries for various promotions are combined, and sorted in a sequence predetermined for qualification for various postal rate classifications, thus to minimize the cumulative cost of mailing the entries. Pertinent information associated with each entry is printed on sheets of card stock, each sheet separable into four individual segments to provide four checks or coupons. Prior to printing, the entries are re-sequenced such that eventual severing of the card stock creates stacks or bundles of mailing items arranged in the desired mailing sequence.

17 Claims, 6 Drawing Sheets

APPARATUS AND PROCESS FOR ADMINISTERING PROMOTIONAL MAILING

This is a Divisional of copending application Ser. No. 07/649,970, filed on Feb. 4, 1991 now U.S. Pat. No. 5,025,475, which is a divisional of parent application Ser. No. 07/328,109, filed Mar. 23, 1989, now U.S. Pat. No. 5,053,955, issued Oct. 1, 1991.

BACKGROUND OF THE INVENTION

The present invention relates to processing promotional items for mailing, and more particularly to preparing checks, coupons or other items related to several different promotions and serially arranging these items to facilitate their bundling prior to mailing.

Consumer product manufacturers routinely engage in promotional activities to encourage the purchase of their products. Among these activities are mass mailings of coupons, checks or other promotional items, either to provide a discount in the form of cash returned to customers for purchasing a particular product, or to encourage purchasers of one product to try another of the manufacturer's products, for example with a discount coupon usable upon purchase of the other product.

Coupons or other documents presented in a form suitable for mailing are disclosed in U.S. Pat. No. 443,141 (Kittredge) directed to a printed pamphlet including one or more coupons and mailing address information, and U.S. Pat. No. 1,415,596 (McKinnie) directed to an advertising or coupon device that can be folded into an envelope addressed to the customer. A related "alternative value" device is disclosed in U.S. Pat. No. 4,722,554 (Pettit), although not in a form suitable for mailing. A single sheet of paper includes a negotiable instrument on one side, and one or more coupons on the other. Use of either the coupon or the negotiable instrument invalidates the other, due to an overlapping arrangement.

The processing of promotions, i.e. providing the appropriate check or discount coupon to the customer as a reward for the initial purchase, involves high volume and labor intensive activity including collection, verification and organization of initial proofs of purchase and related information, preparation of the checks, coupons or other items using preprinted stock provided by the sponsor in connection with the particular promotion, and finally the sorting of individual items based on their mailing destinations.

At any given time, a typical provider of promotion services, is involved with many different promotions of various sponsoring manufacturers. Preprinted forms, when provided by different sponsors, can vary in size and shape, thus creating the need to handle individual promotions separately. This increases handling expense, not only in added labor, but also in the mailing cost, as it is difficult with a single promotion to accumulate a volume of items sufficient to qualify for certain reduced postage rates, e.g. the reduced rate available for mail presorted by zip code of the destination. Manual recombination and sorting of items for multiple promotions would be prohibitively expensive.

Frequently checks or coupons are mailed in envelopes, which involves further costs of material for the envelopes, printing the envelopes and inserting items into the envelopes. These further costs can be avoided by presenting checks in postcard form, as disclosed in U.S. Pat. No. 914,460 (Selden) and in U.S. Pat. No. 1,264,795 (Hill). U.S. Pat. No. 1,374,501 (Greig) discloses a postcard used to arrange a "help wanted" advertisement, with a front face of the postcard including the publisher's address and a stamp location, and the reverse face including the advertisement subject matter heading and space in which to write the advertisement.

As for generating coupons, U.S. Pat. No. 4,723,212 (Mindrum et al) discloses a point of sale computer system for printing redeemable coupons, responsive to sensing the purchase of certain products predesignated to trigger printing coupons for products different than the triggering product. The system includes a store controller and a group of terminals connected to the controller. Also connected to the controller are storage files relating to products, particular coupons, and a log of coupons. At least one of the terminals is connected to a printer which prints coupons in a price bar code format responsive to sensing various triggering products. Bar code information includes value, expiration date, a manufacturer's code and a product family. This information also can be printed on the coupon in human readable form.

While this system addresses certain needs in the retail point of sale environment, and the various printed forms discussed above are satisfactory in particular situations, none of these approaches satisfies the unique needs of administering promotions, particularly when multiple customers and many different promotions are involved.

Therefore, it is an object of the present invention to provide a means for processing promotions which permits a commingling of items from many different promotions into a single printing stream.

Another object is to provide an apparatus for preparing mailing items for a multiplicity of promotions, utilizing a postcard format of uniform shape and size.

Another object is to provide a means for sorting multiple promotional items from different promotions into a series of bundles or groups for convenient, low cost mailing.

Another object is to provide apparatus for printing pluralities of checks, coupons or other promotional items on single sheets of printing stock, in a predetermined printing sequence such that separation of stacks of printing stock into separate stacks of promotion items, subsequent to printing, forms bundles or stacks of such items arranged to minimize the cost of postage.

Another object is to provide a system for fulfilling customer requests based on a multiplicity of different promotions simultaneously, with means for conveniently auditing the progress of individual promotions.

Yet another object of the invention is to provide a postcard check document printed in a magnetic ink, in which a customer mailing address zip code is printed in a U.S. postal service standard bar code form, and in which certain information pertinent to negotiating the check is printed in a standard magnetically readable character font, with the postal bar code conveniently removable prior to negotiating the check.

SUMMARY OF THE INVENTION

To achieve these and other objects, there is provided a process for preparing multiple individual promotional mailing items based on a plurality of promotions, in a form to reduce the cost of mailing to multiple destinations, including the following steps:

a. storing a plurality of promotion entries, each uniquely associated with one of a plurality of promotions, in a first bit-encoded data storage means, each of the promotion entries including a unique promotion flag and a promotion legend identifier unique to the associated promotion;

b. loading multiple data entries into a second bit-encoded data storage means, each data entry including a mailing address and one of the promotion flags;

c. matching the promotion flags to operatively associate the first data storage means and the second data storage means, and adding each of the promotion entries to each of its associated data entries, to form multiple combined entries, and storing the combined entries in a third bit-encoded data storage means;

d. sorting the combined entries into sets and subsets independently of the promotion flags, with each of the sets corresponding to one of a plurality of different postal mailing rate classifications, and with each of the subsets corresponding to one of a plurality of different designated postal delivery areas based upon the mailing addresses;

e. arranging the sets and subsets in a predetermined sequence of the combined entries;

f. generating a plurality of entry images, one image associated with each of the combined entries, wherein each one of the images includes its associated address and a promotion legend corresponding to said identifier; and g. printing the entry images individually upon pieces of printing stock and in a printing sequence dependent upon the predetermined sequence, thereby to form individual printed mailing items, with the mailing items serially arranged to facilitate their grouping into bundles corresponding to the subsets of combined entries.

Preferably, the process further includes storing multiple mailing location indicia and their corresponding postal zip codes in yet another bit-encoded data storage means, and operatively associating it with the third data storage means to either confirm the accuracy of the zip code, correct an erroneous or incomplete zip code, or add a zip code.

When mailing items include secondary items prepared for mailing to foreign destinations, or for other reasons not subject to zip code processing, the process includes separating such secondary items prior to performing the above operations on the remaining or primary items. After the operations are performed, the primary and secondary items are re-associated.

In a preferred embodiment, the printing stock includes stacks of sheets, each sheet being severable into four individual and identically sized segments corresponding to the individual mailing items. In this event, the printing step involves selectively reordering the predetermined sequence to provide the printing sequence. Consequently, severing stacks of sheets after printing arranges stacks of the individual segments into the appropriate bundles of mailing items, grouped for minimal cost mailing.

An alternative form of the present invention is a process for printing multiple checks and arranging the checks in a predetermined sequence to facilitate low cost mailing to multiple destinations. This process includes the steps of:

a. loading multiple data entries into a first bit-encoded data storage means, each data entry including a payee name, a payee mailing address, a check amount, and one of a plurality of account flags, each account flag uniquely identifying a checking account maintained in a drawee financial institution;

b. storing a plurality of account entries in a second bit-encoded data storage means, each account entry including one of the account flags, a checking account number and drawee information identifying the associated drawee;

c. sorting the data entries into sets and subsets independently of the account flags, with each of the sets corresponding to one of a plurality of different postal mailing rate classifications, and with each of the subsets corresponding to one of a plurality of different designated postal delivery areas based upon the payee mailing addresses, and arranging the sets and subsets in a predetermined sequence of the data entries;

d. assigning a check number to each of the account entries, matching the account flags to operatively associate the first data storage means and the second data storage means, to add each of the account entries to each of its associated data entries, and incrementing the check number each time the associated checking account is matched with one of the data entries;

e. generating a plurality of entry images, one image associated with each of the data entries, each of the images including its associated payee name, payee mailing address, check amount, check number, account number and drawee information; and f. printing the entry images individually upon pieces of printing stock and in a printing sequence dependent upon the predetermined sequence, thereby to form individual printed checks, serially arranged to facilitate their grouping into bundles of checks corresponding to the subsets of entries.

Preferably, each check is in a post card format, with an edge strip severable from the remainder of the check. The postal zip code, printed in magnetic bar form with a magnetic ink, is then located on the edge strip, while the check number, account number and certain information designating the drawee financial institution is printed on the remainder, again in a magnetic ink and in a standard magnetic character font. Accordingly, the check when mailed can qualify for the lowest cost "bar code" mailing rate. The edge strip is torn away before negotiation of the check, so that the postal bar code no longer is present to interfere with an accurate magnetic reading of the check and drawee information.

In practice, the multiple requests for fulfillment of many promotions can be organized initially by promotion, for example on magnetic tape reels, one reel associated with each promotion. Promotion control records for multiple promotions can be stored on a magnetic disc, and in the case of checks, account control records covering a plurality of checking accounts are stored on one or more magnetic discs. A controller, for example a digital computer, matches the data on the magnetic tapes and discs according to shared promotion numbers and account numbers, thus to provide combined or up-dated individual entry records.

The individual records further are merged with a record of nine-digit postal zip codes, stored for example on a magnetic disc, to confirm, correct or provide the nine digit zip code appropriate to each combined entry. Then, the entries from all involved promotions are sorted, independently of the promotions, into sets according to applicable postage rates, and subsets according to postal delivery areas based on the zip codes.

A final sorting operation takes into account the printing of four checks (or coupons) on each sheet of printing stock. Because of this final sorting, stacks of sheets, when severed after printing, provide individual stacks of checks or coupons presorted into the appropriate subsets for minimum postage.

Thus, in accordance with the present invention, large amounts of data for different promotions and multiple individual entries are processed rapidly and efficiently, with checks and coupons generated in sufficient volume to qualify for discounted postage, even though individual promotions may include only a single check or coupon. The use of a uniform size and shape of sheet stock for all promotional items eliminates the problem of excess custom stock. An individualized or custom appearance is achieved by storing textual information and digitized logotypes of the sponsor of each promotion. Thus, the cost savings of uniform stock are achieved without sacrificing the sponsor's desire to distinguish its promotions from programs of other sponsors.

IN THE DRAWINGS

For a further understanding of the above and other features and advantages, reference is made to the following detailed description and the drawings, in which.

DETAILED DESCRIPTION OF THE PREFERRED EMBODIMENTS

Figure 1:
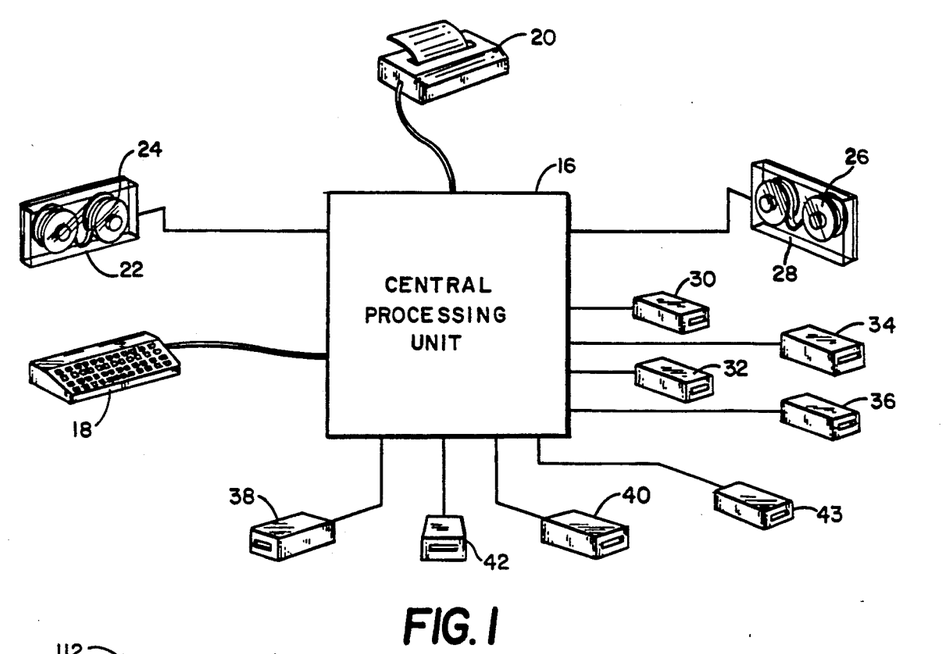
FIG. 1 is a diagrammatical view of apparatus used in performing a process for preparing multiple individual promotional checks or coupons, in accordance with the present invention.

Turning now to the drawings, there is shown in FIG. 1 a system for preparing promotional checks, discount coupons or other promotional items in a sequence to facilitate their assembly into bundles of mailing items, each associated with a designated postal delivery area. Ordinarily, companies sponsoring promotions do not perform these activities directly, but rather through a provider of these services. Accordingly, the provider is likely to serve a wide variety of sponsors or clients, and at any given time may be involved in hundreds of different promotions with hundreds of thousands of individual items to prepare and mail.

The system in FIG. 1, therefore, is preferably configured to process high volumes of items and corresponding data. At the heart of the system is a central processing unit (CPU) 16, for example an IBM Model 4381 main frame computer, operated through a keyboard 18 or other suitable data entry means. Discount coupons or checks are generated with a printing system 20 operatively connected to the processing unit. A preferred printing system is a Xerox Model 8790 electronic printer, which provides hot-fusion laser printing with a dry magnetic ink to enable magnetic reading of information printed on the promotional items.

A number of peripheral devices are operatively connected processing unit 16, including a magnetic tape drive 22 and an input magnetic tape reel 24 for storing customer entries in bit-encoded form. An output magnetic tape reel 26 and a magnetic tape drive 28 are provided for storing updated customer data entries, each corresponding to one of the original entries stored on tape reel 24.

A plurality of disc drives are associated with central processing unit 16, including a disc drive 30 for storing promotion control records, a disc drive 32 for storing account control records, and disc drives 34 and 36 housing VSAM (virtual storage assembly method) cumulative statistics relating to the production control records and account control records, respectively. A disc drive 38 contains a plurality of operation programs for sorting entries and for assigning and incrementing check numbers, and a disc drive 40 contains mailing area and zip code information. A disc drive 42 contains custom textual material and logotypes in digital form and relating to individual promotions and sponsors, along with a file of authorized signatures for various checking accounts of individual sponsors. Finally, a disc drive 43 contains further customer textual material and logotypes in digital form, again relating to individual promotions and sponsors. The information stored in disc drive 43 is used only in connection with coupons, for printing the reverse side of each mailing item.

Figure 2:
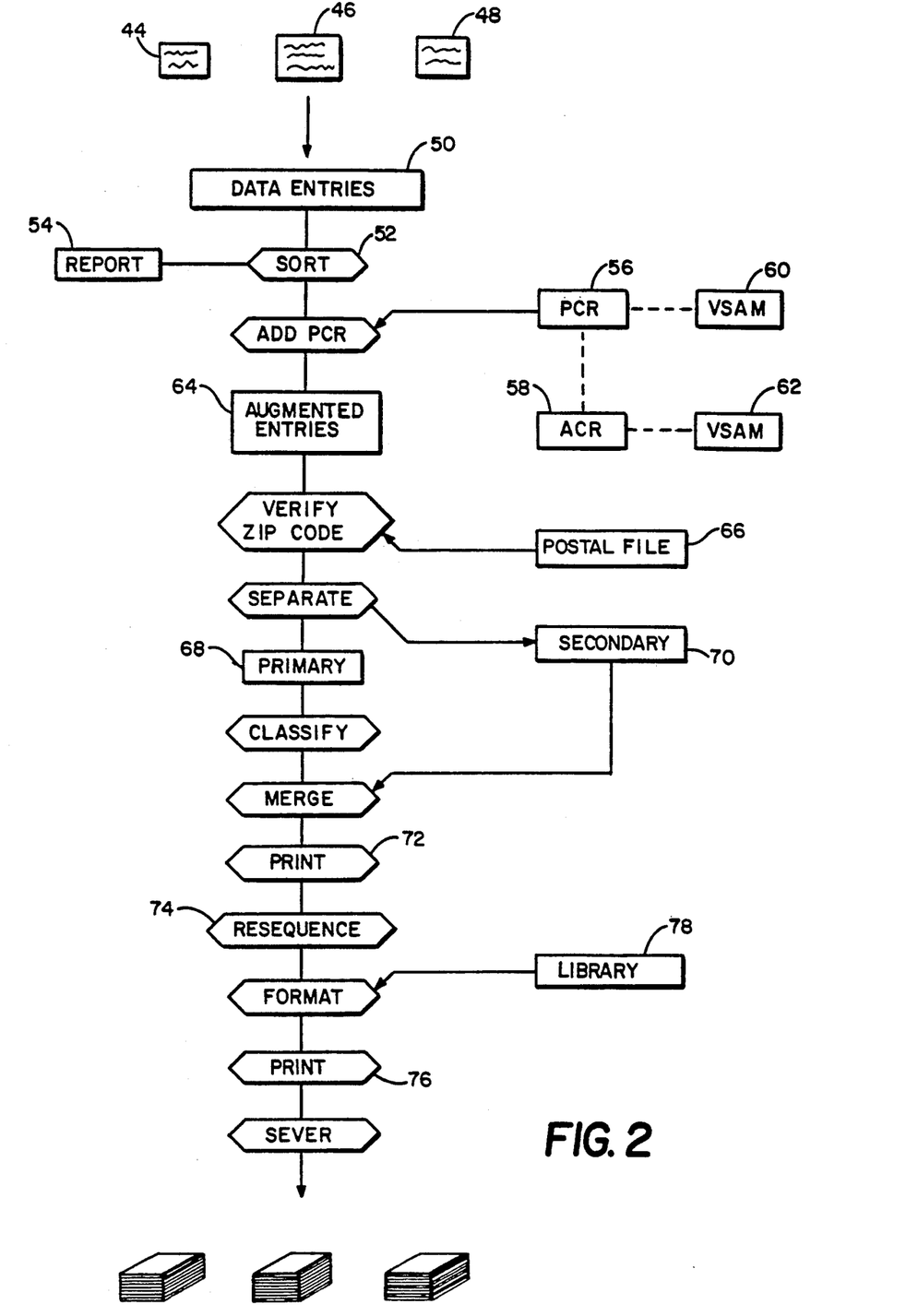
FIG. 2 is a schematic representation of the process.

With reference to FIG. 2, the system of FIG. 1 is employed after receiving multiple requests for promotional items and performing preliminary manual operations. These include prescreening entries to verify purchases, e.g. by a proof of purchase seal, eliminating duplicates, and sorting entries into batches as at 44, 46 and 48. Each batch is associated with only one of the promotions involved, while a single promotion may include more than one batch.

Each original data entry 50 includes the name and mailing address of a customer destined to receive the check or coupon, the value (e.g. amount of the check or discount) of the item, and the following identifying numbers: a promotion number or flag, a mail lot number, a batch number and an order number. The promotion flag uniquely identifies the sponsor and the particular promotion. The mail lot number identifies a particular group of batches. The order number uniquely identifies each data entry. The system is used initially by loading multiple data entries on tape reel 24, using keyboard 18 or other suitable data entry device operatively connected to tape drive 22.

If desired, customer requests entered into the system by tape reel 24 may be sorted according to promotion flags as indicated at 52, for generating reports 54 useful in verifying information prior to further processing, e.g. by client, by promotion, or by value of the check or discount coupon.

Also, prior to further processing, files of bit-encoded data are created for adding data to each data entry 50. These include promotion control records 56 stored on disc 30, and account control records 58 stored on disc drive 32. A single promotion control record, in virtual "card image" form, is associated with each of the promotions involved. Each promotion control record includes its associated promotion flag or identification number, and a single bank account number or flag which uniquely identifies a checking account upon which the check is drawn. Further, the promotion control record includes a logo identifying number associated with one of the digitized logotypes stored on disc drive 42, and a text identification number associated with a message of the promotion sponsor.

Each account control record 58 is associated with a particular checking account, which may cover more than one promotion. Each account control record includes its identifying account flag, the name and address of the bank or other drawee financial institution where the checking account is maintained, a check number to be incremented during processing, a signature number identifying an associated authorized signature stored on disc drive 42, and other information identifying the institution, such as the ABA routing and transit numbers.

As indicated at 60 and 62 respectively, records 56 and 58 are associated with VSAM files for maintaining cumulative statistics. In particular, file 60 accumulates check or coupon quantities and amounts organized by promotion, while file 62 accumulates quantities and amounts by checking account, and assigns and tracks check numbers in sequence in each of the involved checking accounts.

The respective production control records and account control records are created by entering appropriate information onto their associated disc drives using keyboard 18 or other suitable entry devices. After creation of these files, CPU 16 matches promotion flags to associate individual promotion control records 56 with selected data entries 50 to provide augmented entries 64 as is further explained below in connection with FIG. 3. At the same time, each data entry which corresponds to a promotional check in the making is assigned a check number. The check number, stored in VSAM file 62 with the associated checking account, is then incremented.

The augmented data entries are matched with a postal file 66 stored on disc drive 40 based on the mailing address, in order to verify the accuracy of a postal zip code, if any, stored as part of the mailing address in the original data entry. Based upon a comparison, the zip code is either confirmed or corrected. A zip code is added if none was present. This operation is performed with purchased application programs, for example programs entitled "EZ5" and "M$$$" available from Group One Software of Washington, D.C.

These application programs further are used to separate the augmented data entries into primary entries 68 for further sorting based on the postal zip code, and secondary entries 70 not subject to zip code sorting. The secondary entries have addresses outside of the United States, or are designated for special inspection, usually in connection with the first occurrence of a promotion. The primary data entries then are sorted according to various available postage classifications, again with the application programs. More particularly, the primary entries are divided into three mailing classifications: a bar code qualified class, a presort qualified class, and a residual class. The bar code qualified class includes only mailing items preprinted with a magnetically readable bar code representation of the nine digit zip code, and qualifies for the lowest rate of the three classes. Presort qualified mail is given a reduced postage based on prior sorting based on the zip code.

Each of the three sets of postal rate classifications is further divided into subsets corresponding to postal delivery areas. Finally, the postal application programs are used in predetermining the required number of packages and trays, according to U.S. Postal Service regulations, needed to accommodate the records when organized into these sets and subsets. For example, a typical run may involve from one hundred thousand to one hundred fifty thousand individual entries, with about eighty percent of these entries in the bar code qualified class, with the majority of the remaining twenty percent in the presort qualified class. It should be noted that this predetermination and presorting operation is conducted with the objective of minimum total or cumulative cost of mailing the items. Thus, certain items may be classified as presort, even though printed with the postal bar code.

Following the predetermination of the optimal mailing arrangement for the primary entries, the primary and secondary entries are merged. Thus recombined, the primary and secondary data entries are assigned consecutive run sequence numbers, beginning with the first subset of the bar code qualified class, and ending with the final subset of non-sorted or secondary data entries. The data entries in each subset are numbered consecutively, and all of the subsets within a set are assigned a run sequence number before proceeding to the next set, e.g. to number n entries in accordance with the following table:

| Group | Assigned Run Sequence Numbers |
|---|---|
| Bar code qualified | 1 through a |
| Presort qualified | (a + 1) through b |
| Residual | (b + 1) through c |
| Secondary entries | (c + 1) through n |

Thus is formed a predetermined sequence of all entries, consecutively numbered from 0 though n in a predetermined optimal mailing sequence which ultimately determines the loading of labeled boxes of the items to be mailed.

After the run sequence numbers have been assigned, printer 20 is caused to print a plurality of box labels at 72, each label identifying the postal rate and classification (set), the postal delivery area (subset) identified by a zip code or grouping of zip codes, and a beginning and ending run sequence number. Each label thus corresponds to one of the subsets of primary and secondary entries, and is designated for eventual affixation to a box containing a stack of checks or other mailing items corresponding to one of the subsets. The labels corresponding to the secondary data entries identify the postal rate and class, and the first and final run sequence numbers.

In the presently preferred embodiment, checks, coupons or other promotional items are prepared by printing the desired information upon sheets of card stock arranged in stacks, with each individual sheet severable into four individual promotional mailing items. Accordingly, an obverse face of each single sheet is printed with the appropriate information of four data entries such that severance of the sheet subsequent to printing forms the corresponding four mailing items.

In view of this approach, the data entries must be resequenced as indicated at 74, prior to printing, in order to ensure that the eventual separation of stacks of printed card stock into the individual mailing items forms stacks of individual mailing items that replicate the predetermined optimum mailing sequence, i.e. the aforementioned organization into sets and subsets. In the present embodiment, sheets of card stock are arranged in stacks of fifteen hundred, for eventual separation into four stacks of checks, coupons or other items. Consequently an optimal printing sequence is generated, depending upon the optimal run sequence, in accordance with the following table:

| Run Sequence Number | Printing Sequence |
| --- | --- |
| 0001 | 0001 |
| 0002 | 1501 |
| 0003 | 3001 |
| 0004 | 4501 |
| 0005 | 0002 |
| 0006 | 1502 |
| 0007 | 3002 |
| 0008 | 4502 |
| . | . |
| . | . |
| . | . |
| 5995 | 4499 |
| 5996 | 5999 |
| 5997 | 1500 |
| 5998 | 3000 |
| 5999 | 4500 |
| 6000 | 6000 |

The printing operation 76 can begin as soon as the data entries are organized according to the optimal printing sequence. Then, in accordance with the printing sequence, each data entry is read and its associated information formatted to create an entry image to be printed. In connection with checks, the reading of each data record is followed by using the account flag to match the data entry with its appropriate checking account, and the information appropriate to the checking account is formatted along with the remaining information as part of the image to be printed. As further explained in connection with FIG. 4, the forming of the entry images also involves retrieving promotion legends including the appropriate logotypes and textual material, and authorized signatures from library files 78 on disc 42.

Each time four entry images are formatted, these images are printed upon the obverse face of one of the sheets of card stock whereupon the printed sheet is removed and the next sheet presented for printing, all while the next four consecutive entry images are being formatted These steps are repeated until the printing sequence is complete.

Following printing, stacks of the printed sheet stock are severed into individual stacks of checks, coupons or the like. As a result of the optimal printing sequence, such individual stacks of items correspond to the previously discussed subsets and can be directly loaded into boxes labeled with the printed labels prepared at step 72. The printing and sorting operations leading to printing are completely independent of the promotion, and thus mailing items from many different promotions are commingled in each individual box. This of course is immaterial to the determination of various postal rates, and the organization of mailing items to qualify for various postal rates. Nonetheless, the concern of each sponsor, that its identity and its promotions are clearly distinguishable from the identity and promotions of other sponsors, is satisfied in that each entry image is created based upon its associated promotion control record and account control record. Each check or coupon, although commingled with items from many other sponsors, clearly identifies its associated sponsor and promotion.

Figure 3:
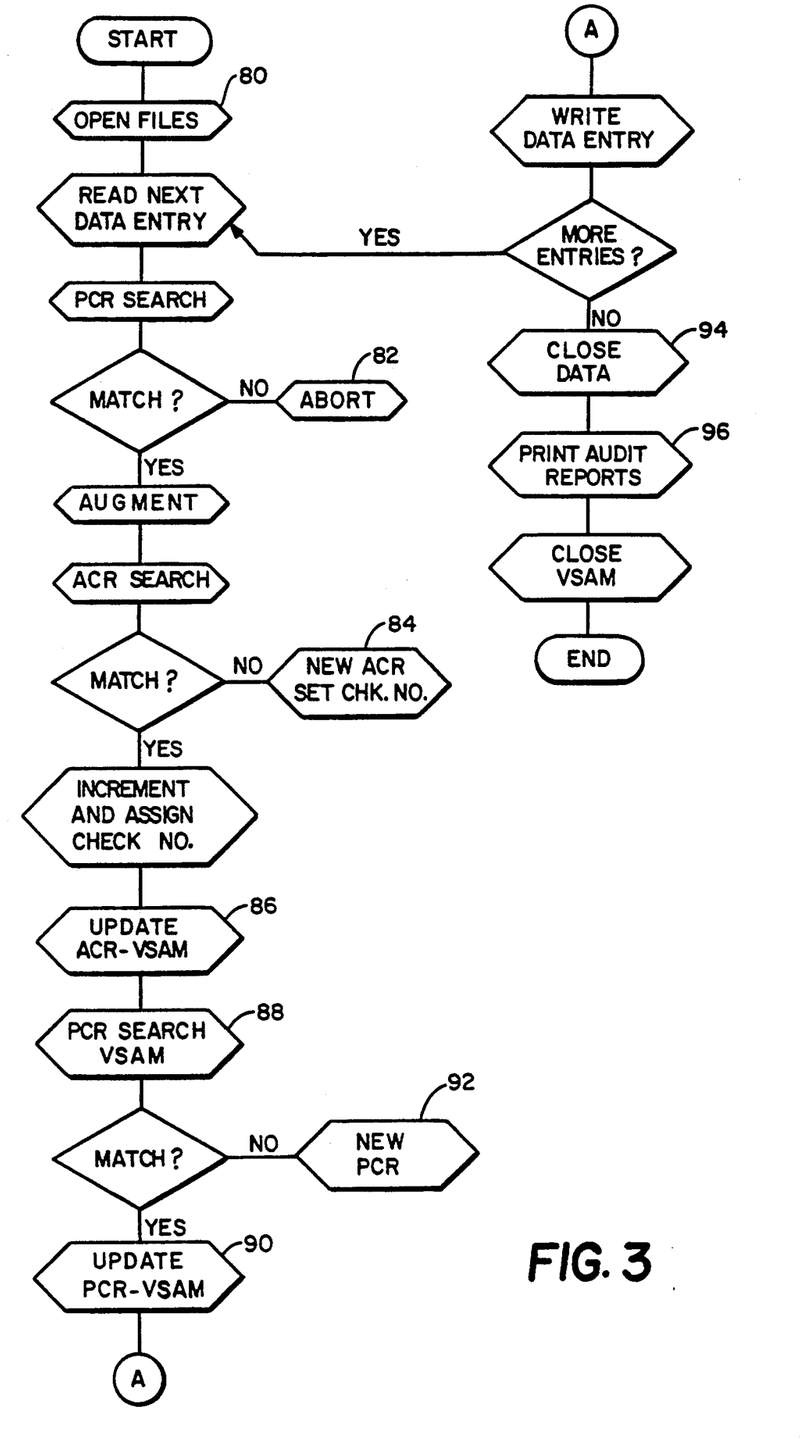
FIG. 3 is a flow chart illustrating part of the process.

FIG. 3 is a flow chart illustrating the updating or augmenting of data entries. As indicated at 80, the process is initiated by opening the files of data entries 50, promotion control records 56, account records 58, and the associated VSAM files 60 and 62, in particular by CPU 16 gaining access to tape reel 24 and disc drives 30, 32, 34 and 36. An individual data entry is read, and a search conducted for a matching promotion flag among promotion control records 56. If no match is found, the program is aborted as indicated at 82. However, when a match is found, information from the appropriate promotion control record is added to the data entry to provide the augmented or updated entry 64.

Next, the augmented data record is matched with account control records 58 in search of a matching account flag. If none is found, a new account record is created, and its corresponding check number set at 000001, or other appropriate predetermined initial number, as indicated at 84. On the other hand, if a match is found, the check number existing in the corresponding account control record 58 is incremented by 1. In either event, the check number is added to the augmented data entry. The associated cumulative record on VSAM file 62 is updated at 86 as to the check quantity and cumulative dollar amount.

Next, VSAM file 60 corresponding to the promotion control records is searched for a matching promotion flag, as indicated at 88. Upon finding a match, VSAM file 60 is updated in connection with the associated promotion, as to the quantity (number of individual entries) and cumulative amount. Conversely, if no match has been found, a new promotion record is created as at 92 in PCR file 56, corresponding to the promotion, which is an indication that the particular promotion is appearing for the first time in the run.

At this stage, information relating to the augmented data entry 64 is entered on tape reel 26 for permanent storage.

After entry of the augmented record, the next original data entry 50 is read and the above-described steps are repeated. After the final original data entry has been processed and the absence of further original entry is confirmed, the data entry file is closed at 94, the ending check number for each checking account is stored in connection with its account in account control records 58. At 96, the files containing promotion control records 56, account control records 58 and their associated VSAM files are read and audit reports printed. After the printing of audit reports, these files are closed, ending the augmenting process. At the conclusion of augmenting, tape reel 26 includes an augmented data entry 64 corresponding to each original data entry 50 on tape reel 24, with each augmented entry including the original information, along with the appropriate bank account number if the mailing item is a check, a logotype identifying flag, and a flag identifying textual material of the sponsor for the particular promotion. Further, each account control record is updated with the current check number, and the associated VSAM files are updated as to quantity and amount.

Figure 4:
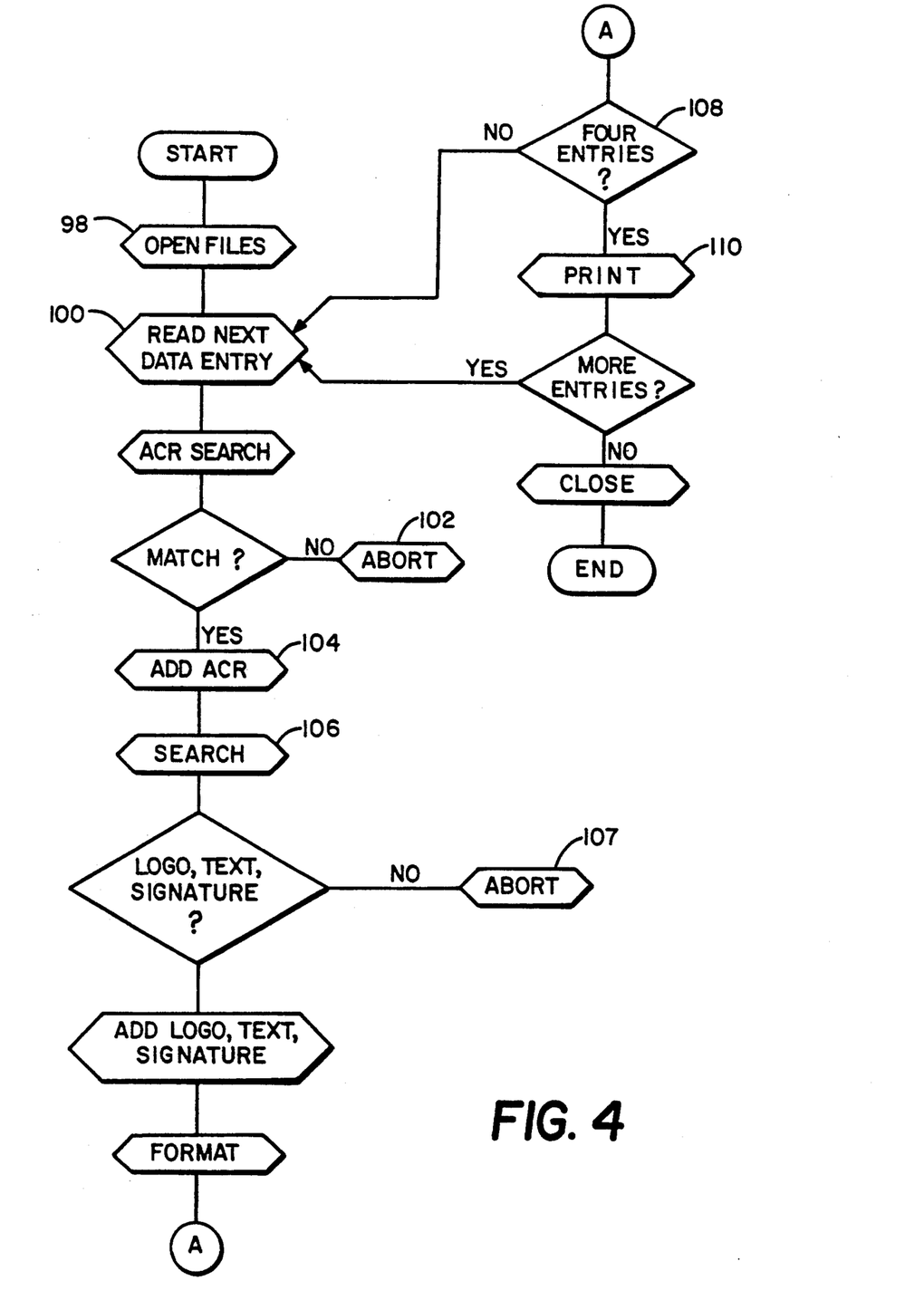
FIG. 4 is a flow chart illustrating another part of the process.

As seen in FIG. 4, the printing process begins at 98 with the opening of the augmented data entry files 64, the account control records 58 and library files 78, in particular through central processing unit 16 gaining access to tape reel 26 and tape drive 28, and disc drives 32 and 42. Augmented data entries 64 are read as indicated at 100, in the order corresponding to the optimal printing sequence. Account control records 58 are then searched for a matching account number, and if no match is found the process is aborted at 102.

Otherwise, the data entry is augmented with the account information at 104 and searched at 106 for the presence of a logotype identifying flag, a text identifying flag and an authorized signature identifying flag. If these identifiers are located, the identified logotype, text and authorized signature are combined with the augmented data entry and previously associated account control record, for a combined formatting of the information contained in the augmented data entry, the bank account number, bank name, address, routing symbol and transit number from the account control record, and the logotype, textual material and signature from the library file. If the identifiers are not located, the process aborts as indicated at 107.

Following formatting, a count is taken at 108 to determine whether four data entries and associated information have been formatted. If not, the next data entry is read and the process is repeated. Upon the formatting of four entries, the information for the entries is printed on the card stock sheets as indicated at 110. The process proceeds until all of the augmented data entries have been read, processed, formatted and printed, whereupon the files are closed and the process terminated.

The present system can process either checks or coupons as the mailing items. When the mailing items are coupons as opposed to checks, they are handled in a separate run according to a process including steps different from those represented in FIGS. 3 and 4. For example, steps relating to the account control records such as ACR search, update ACR-VSAM and adding ACR information, are unnecessary. On the other hand, the preparation of coupon mailing items involves incrementing coupons with a coupon number corresponding to the check number in the case of checks, and further involves an additional printing step in connection with the obverse surface printing described in connection with FIG. 4. More particularly, after the obverse side of each item is printed, the reverse sides of the card stock sheets are presented for printing, in accordance with the information stored in disc drive 43. Access to the corresponding reverse side information is achieved by matching promotion control flags, in essentially the same manner as gaining access to the account control records when preparing checks.

Figure 5:
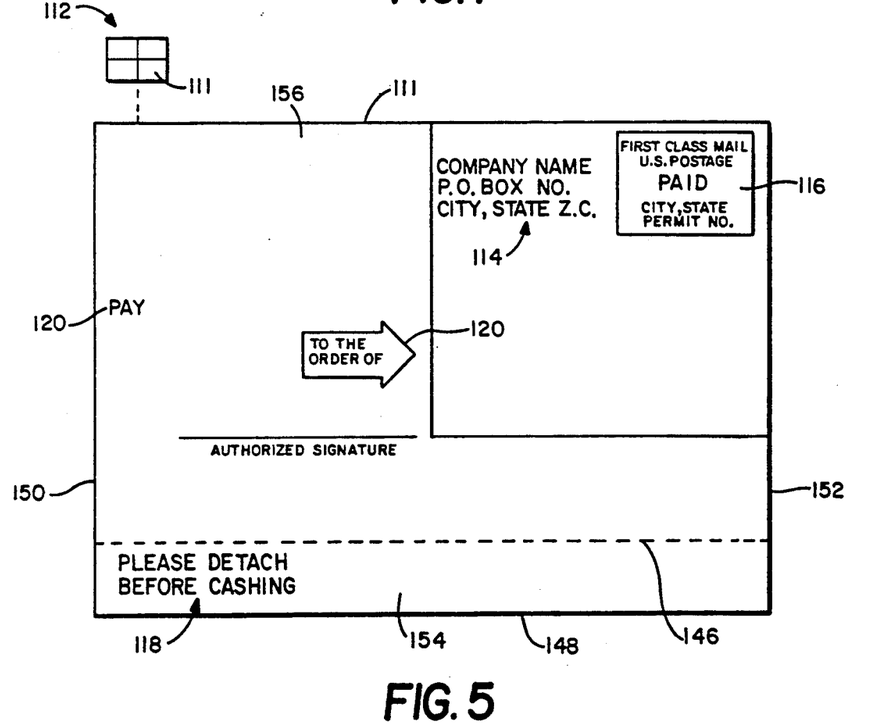
FIG. 5 is a top plan view of a negotiable instrument form suited for use in the process.

FIG. 5 shows one segment or card 111 of a sheet 112 of post card stock used in the present system to generate post card checks. As previously mentioned, each sheet eventually is severed into four checks or other mailing items, with one of four equally sized segments corresponding to each item.

Before processing in accordance with the present invention, sheet 112 may be entirely blank, but preferably is preprinted with certain information common to all sponsors and promotions involved, for example an identification of the provider of the promotion processing services at 114, indication of prepaid postage at 116, tear-away instructions at 118, and information common to all checks as at 120.

Figure 6:
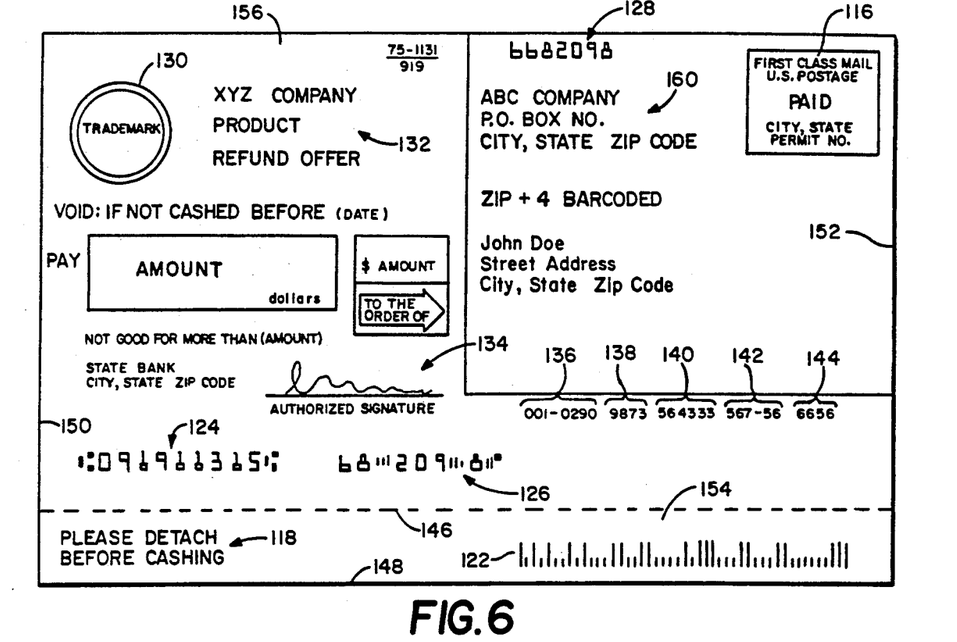
FIG. 6 is a top plan view of a negotiable instrument prepared from the form according to the process.

Card 111 is shown in FIG. 6, after the printing of additional information corresponding to the customer, promotion, sponsor and checking account. Preferably, all of the additional information is printed in a single step with a magnetically readable ink, thus to enable use of a bar code representation of the nine-digit postal zip code as indicated at 122, and a standard magnetically readable character font to print banking information as indicated at 124 and 126. More particularly, the bank route and transit numbers are printed at 124, with the last six digits of a seven-digit check number written at 126. The full check number is printed near the top of the sheet segment at 128.

The check number, the customer name and address, including the zip code, and the check amount all are based on information contained in the augmented data entry 64, with the zip code information having been confirmed, corrected or added using the application programs as previously noted. The checking account number, bank name and address, and route and transit numbers are provided according to the associated account control record 58. Finally, a design logotype 130, custom text 132 and authorized signature 134 are printed according to library file 78, with the appropriate entries in each case having been identified by the logotype, text and authorized signature identifiers originally in the associated promotion control record and account control record.

Finally, a series of numbers is printed on the check, including the promotion flag 136, the batch number 138, the order number 140 which is unique to the individual receiving the check, the mail lot number 142, and finally the run sequence number 144. These numbers facilitate a monitoring of the check preparation and printing process, in that the promotion flag identifies the sponsor and the particular promotion of that sponsor, for a convenient comparison and confirmation that the appropriate design logotype and textual information have been printed. The run sequence numbers confirm that stacks of checks have been presorted and printed in the proper order. Run sequence numbers at the top and bottom of each stack of checks can confirm correspondence to a particular subset of entries, and can be used to reassemble stacks of checks, should they become separated unintentionally, for example through accident or careless handling.

In each sheet segment used as a check, a series of perforations 146 is provided proximate and parallel to a bottom edge 148 of card or sheet segment 111, and runs from one side edge 150 to an opposite side edge 152. The perforations divide card 111 into a tear-away edge strip 154 and a remainder 156. The postal bar code 122 is printed on tear-away strip 154, while the banking and checking account information, particularly the information represented in a magnetic ink character font at 124 and 126, is printed on remainder 156.

Card 111 is designed as a combination postal card and check, with separate mailing and negotiation configurations. More particularly, the card is designed for mailing with strip 154 and remainder 156 attached, to enable a magnetic reading of the nine-digit zip code by postal service equipment. The customer receiving the card, however, is instructed to fold the card along perforations 146 and tear, to remove strip 154 prior to depositing or otherwise negotiating the check. This removes bar code representation 122 from the check, to eliminate any possibility of the bar code representation interfering with an accurate reading of the magnetically readable character font area conveying the banking and checking account information.

Figure 7:
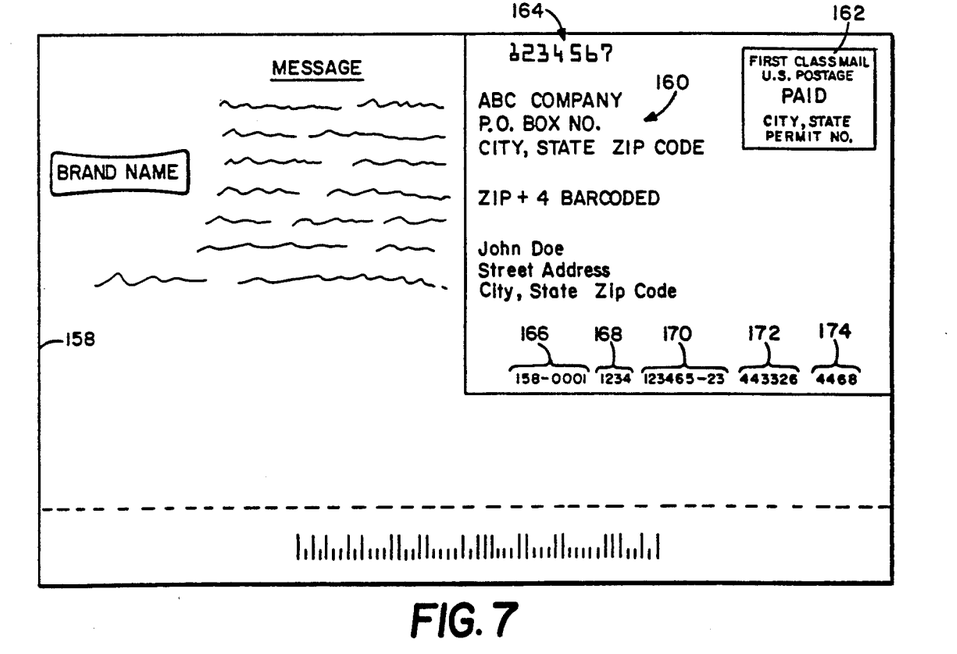
FIG. 7 is a top plan view of a discount coupon prepared according to the process.

The preparation of coupons is essentially similar to the preparation of checks, with the sorting and printing processes simplified due to the absence of checking account and financial institution information, but with the added printing and formatting steps relating to the reverse side of each sheet of card stock. FIG. 7 illustrates a segment of a sheet 158 of the same card stock used in printing checks, with certain information preprinted if desired, such as the promotion processing entity at 160 and postage paid information at 162. Again, all additional information for the obverse side is provided in a single printing step utilizing magnetically readable ink. In the case of coupons, the added information is based totally on the augmented data entries, i.e. the original data entries as updated with information from the appropriate promotion control records, and with the zip code provided or confirmed from the postal record file. A coupon number 164 is printed near the top of the card in lieu of a check number. A stream of numbers again includes the promotion number at 166, the batch number at 168, the order number 170, mail lot number 172, and run sequence number 174.

Figure 8:
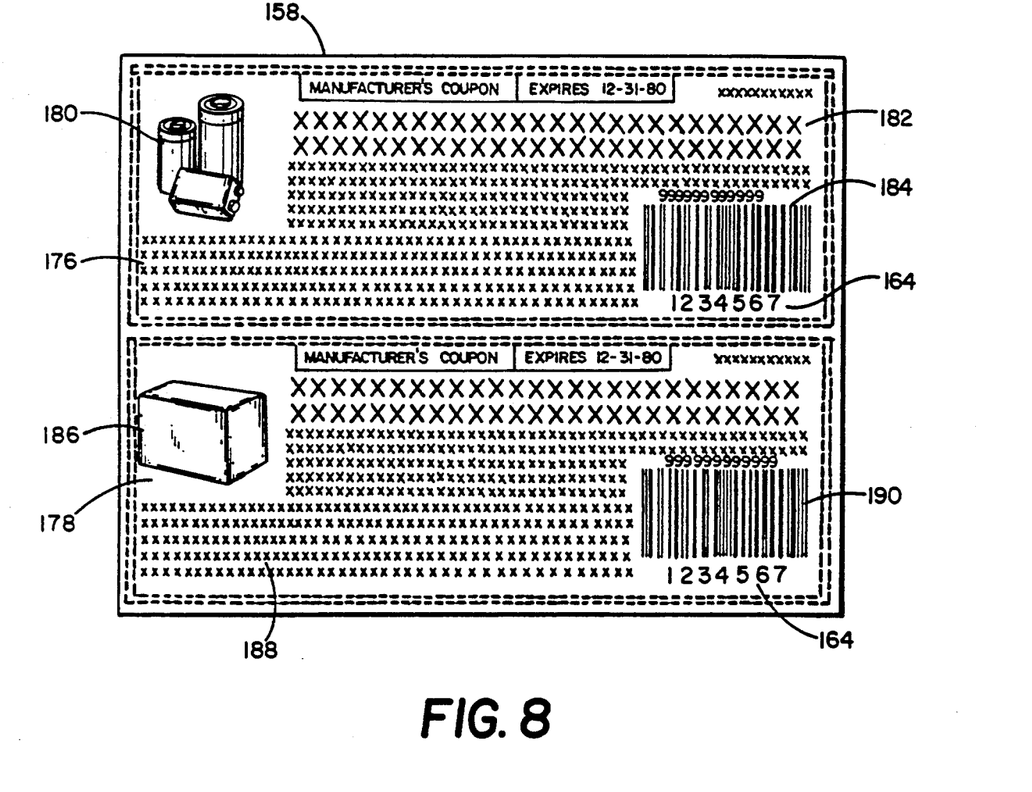
FIG. 8 is a bottom plan view of the discount coupon of FIG. 7.

The reverse side of sheet 158 is shown in FIG. 8 and includes images for two coupons 176 and 178, respectively. Printed on coupon 176 is a logotype 80, textual material at 182 which can be printed in a variety of different sizes if desired, and a universal product code (UPC) symbol 184. Likewise, a logotype 186, text 188 and UPC symbol 190 are printed as part of coupon 178. Both coupons have the same coupon number at 164, as both coupons are part of the same mailing item. Finally, an expiration date is printed near the top of each coupon.

As noted previously, the information for the reverse side printing of sheet 158 is stored as a separate library on disc drive 43. Accordingly, logotypes 180 and 186 can be different from one another if desired, and different from the logotype appearing on the obverse side of the sheet. Similarly, UPC codes 184 and 190, which are magnetically readable, can be identical or different.

Thus, in accordance with the present invention, information relating to multiple individual requests, made in connection with numerous promotions, is merged into a single printing stream, in a sequence predetermined for an optimally low-cost mailing, and further predetermined such that severance of printed stock, into separate stacks of items for mailing, arranges the separate stacks of items according to the predetermined sequence. A convenient, uniform postal card format minimizes handling and mailing expense, yet ensures that each promotion and sponsor is identified by custom textual material and logotype. Finally, the card format is uniquely well suited for carrying postal zip code information, UPC information and checking account information in magnetically readable form.

What is claimed is:

1. A computer implemented process for preparing multiple individual promotional mailing items based on a plurality of promotions, for mailing to multiple destinations in a manner selected to facilitate mailing the items at a reduced cost, including the steps of:
   screening multiple data entries to eliminate any duplicates of the entries;
   storing a plurality of promotion entries, each uniquely associated with one of a plurality of promotions, in a first bit-encoded data storage means, each of said promotion entries including a unique promotion flag and a promotion legend identifier unique to the associated promotion;
   loading the multiple screened data entries into a second bit-encoded data storage means, each screened data entry including a mailing address and one of said promotion flags;
   matching the promotion flags to operatively associate said first data storage means and said second data storage means, and adding each of said promotion entries to each of it s associated screened data entries, to form multiple combined entries;
   sorting said combined entries into sets and subsets independently of said promotion flags, with each of said sets corresponding to one of a plurality of different postal mailing rate classifications, and with each of said subsets corresponding to one of a plurality of different designated postal delivery areas based upon said mailing addresses;
   arranging said sets and subsets in a predetermined sequence of said combined entries;
   generating a plurality of entry images, one image associated with each of said combined entries, wherein each one of said image includes its associated address and promotion legend; and
   printing said entry images individually upon pieces of printing stock and in a printing sequence depending upon said predetermined sequence, thereby to form individual printed mailing items, with said mailing items serially arranged to facilitate their grouping into bundles corresponding to said subsets of combined entries.

2. The process of claim 1 including the further steps of:
   storing multiple mailing location indicia and their corresponding postal zip codes in a third bit-encoded data storage means; and
   operatively associating said third data storage means with said combined entries to perform one of the following operations upon each of said combined entries: confirming the accuracy of a zip code contained in the entry, correcting an erroneous or incomplete zip code in the entry, and adding a zip code to the entry.

3. The process of claim 2 including the further steps of:
   before operatively associating said combined entries and third data storage means, separating said combined entries into primary entries for zip code processing and secondary entries not subject to zip code processing;
   performing said operations only upon said primary data entries; and
   following said operations, re-associating said primary and secondary entries.

4. The process of claim 1 wherein:
   said pieces of printing stock comprise sheets arranged in stacks, each sheet being severable into a selected number of parts corresponding to said individual mailing items; and
   said printing step includes selectively reordering said predetermined sequence of said combined entries to provide said printing sequence such that a severing of stacks of said sheets into stacks of said parts, following printing, forms said bundles of mailing items.

5. The process of claim 1, including the further step of:
   prior to said step of loading the multiple screened data entries, sorting the data entries into a plurality of batches, with all of the data entries in each batch being associated with the same one of said plurality of promotions.

6. The process of claim 1 wherein:
   each of said entry images includes obverse side information and reverse side information;
   each of said pieces of the printing stock has an obverse side and a reverse side; and said step of printing said entry images includes printing the obverse information of each entry image on the obverse side of its associated piece of the printing stock, and the reverse side information on the reverse side of said associated piece of the printing stock.

7. An apparatus for preparing multiple individual promotional items involving a plurality of promotions, for mailing to multiple destinations in a sequence selected to reduce the cost of such mailing, including:

a first bit-encoded data storage means for storing a plurality of promotion entries, each promotion entry including a promotion flag and a promotion legend unique to one of said promotions;

a second bit-encoded data storage means for storing multiple data entries, each data entry including a mailing address and one of said promotion flags;

a control means for matching the promotion flags to operatively associate said first data storage means and said second data storage means, thereby to add each of said promotion entries to each of its associated data entries, thus to form multiple combined entries;

a third bit-encoded data storage means for storing said combined entries;

a first sorting means operatively associated with said control means and third data storage means, for sorting said combined entries into sets and subsets, with each of said sets corresponding to one of a plurality of different postal mailing weight classifications, and with each of said subsets corresponding to one of a plurality of different designated postal delivery areas based upon said mailing addresses, and further for arranging said sets and subsets in a predetermined sequence of said combined entries;

image generating means operatively associated with said control means and said third data storage means, for generating a plurality of entry images, one image associated with each of said combined entries, each of said images including the mailing address and promotion legend of its associated combined entry;

a second sorting means operatively associated with said control means and third storage means for arranging said entry images in a printing sequence dependent upon said predetermined sequence;

multiple sheets of printing stock, each of said sheets being preprinted to bear information common to all of said promotions; and a printing means for printing said entry images upon said sheets of printing stock according to said printing sequence to form multiple mailing items, each of the mailing items bearing said common information and a different one of the entry images, said mailing items being serially arranged to facilitate their collection into bundles corresponding to said subsets.

8. The apparatus of claim 7 wherein:
said first and third data storage means comprise magnetic disc drives, and said second data storage means comprises a magnetic tape drive.

9. The apparatus of claim 7 wherein:
each of said promotion legends includes a logo identifying a sponsor of the associated promotion.

10. The apparatus of claim 7 wherein:
each of said promotion legends includes textual material related to the promotion.

11. The apparatus of claim 7 wherein:
each of said promotion flags is a number unique to its associated promotion, and said associated entry image includes said promotion number.

12. The apparatus of claim 7 wherein:
each of said data entries further includes a payee name identifying an individual, and an order number unique to the identified individual, and a value.

13. The apparatus of claim 12 wherein:
said mailing items comprise coupons.

14. The apparatus of claim 7 wherein:
at least selected ones of said mailing addresses include a postal zip code, and one of said sets corresponds to a bar code classification of mail printed with magnetically readable bar codes representing postal zip codes, said printing means utilizes magnetic ink, and each of said entry images including one of said selected mailing addresses further includes an associated postal zip code in human readable form and in magnetic bar code form.

15. The apparatus of claim 7 further including:
a fourth bit-encoded data storage means for storing multiple mailing location indicia and their corresponding postal zip codes;

said control means further operatively associate said fourth data storage means with said third data storage means to perform one of the following operations upon each of said combined entries: confirming the accuracy of a postal zip code contained in the entry, correcting an erroneous or incomplete zip code in the entry, and providing the entry with a zip code.

16. The apparatus of claim 7 wherein:
said pieces of printing stock comprise sheets arranged in stacks, each sheet being severable into a selected number of equally sized parts corresponding to said individual mailing items; and said second sorting means reorders said predetermined sequence of said combined entries, to provide for printing of said selected number of entry images on each of said sheets whereby, upon a severing of each stack of sheets into said select number of separate stacks of said parts, each said stack or parts comprises one of said bundles of said mailing items.

17. An apparatus for preparing multiple individual promotional items involving a plurality of promotions, for mailing to multiple destinations in a sequence selected to reduce the cost of such mailing, including:

a first bit-encoded data storage means for storing a plurality of promotion entries, each promotion entry including a promotion flag and a promotion legend unique to one of said promotions;

a second bit-encoded data storage means for storing multiple data entries, each data entry including a mailing address and one of said promotion flags;

a control means for matching the promotion flags to operatively associate said first data storage means and said second data storage means, thereby to add each of said promotion entries to each of its associated data entries, thus to form multiple combined entries;

a third bit-encoded data storage means for storing said combined entries;

a fourth bit-encoded data storage means for storing a plurality of reverse side entries, each reverse side entry associated with one of said promotions;

said control means further matching the promotion flags to operatively associate said third and fourth data storage means, thereby to add each of said reverse side entries to its associated combined entry;

a first sorting means operatively associated with said control means and third data storage means, for sorting said combined entries into sets and subsets, with each of said sets corresponding to one of a plurality of different postal mailing weight classifications, and with each of said subsets corresponding to one of a plurality of different designated postal delivery areas based upon said mailing addresses, and further for arranging said sets and subsets in a predetermined sequence of said combined entries;

image generating means operatively associated with said control means and said third and fourth data storage means, for generating a plurality of entry images, one entry image associated with each of said combined entries, each of said entry images including the mailing address and promotion legend of its associated combined entry and the associated reverse side entry;

a second sorting means operatively associated with said control means and third storage means for arranging said entry images in a printing sequence dependent upon said predetermined sequence; and a printing means for printing said entry images upon multiple sheets of printing stock according to said printing sequence to form multiple mailing items, each of said mailing items having an obverse side and a reverse side and bearing the mailing address and promotion legend on the obverse side and bearing the reverse side entry on the reverse side, said mailing items being serially arranged to facilitate their collection into bundles corresponding to said subsets.

* * * * *